United States Patent
Stoilos et al.

(10) Patent No.: US 11,042,531 B2
(45) Date of Patent: Jun. 22, 2021

(54) METHOD AND SYSTEM OF COMBINING KNOWLEDGE BASES

(71) Applicant: Babylon Partners Limited, London (GB)

(72) Inventors: Georgios Stoilos, London (GB); David Geleta, London (GB); Jetendr Shamdasani, London (GB); Mohammad Khodadadi, London (GB)

(73) Assignee: Babylon Partners Limited, London (GB)

( * ) Notice: Subject to any disclaimer, the term of this patent is extended or adjusted under 35 U.S.C. 154(b) by 413 days.

(21) Appl. No.: 16/024,004

(22) Filed: Jun. 29, 2018

(65) Prior Publication Data

US 2020/0004856 A1    Jan. 2, 2020

(51) Int. Cl.
*G06F 16/23* (2019.01)

(52) U.S. Cl.
CPC .................. *G06F 16/2365* (2019.01)

(58) Field of Classification Search
None
See application file for complete search history.

(56) References Cited

U.S. PATENT DOCUMENTS

| | | | | |
|---|---|---|---|---|
| 10,042,836 | B1 * | 8/2018 | Wang | G06F 16/36 |
| 2009/0077002 | A1 * | 3/2009 | Clark | G06F 16/383 |
| 2013/0238531 | A1 * | 9/2013 | Seidler | G06F 16/367 |
| 2013/0297347 | A1 * | 11/2013 | Cardoza | G06F 16/36 |
| 2018/0218071 | A1 * | 8/2018 | Donndelinger | G06F 16/367 |

OTHER PUBLICATIONS

Novacek et al., "Infrastructure for Dynamic Knowledge Integration—Automated Biomedical Ontology Extension Using Textual Resources", all page. (Year: 2008).*
Shvaiko, P., et al., "Ontology matching: state of the art and future challenges", Dec. 12, 2013, 21 pages.
Solimando, A., et al., "A Multi-strategy Approach for Detecting and Correcting Conservativity Principle Violations in Ontology Alignments", 2014, 12 pages.

(Continued)

*Primary Examiner* — Son T Hoang
(74) *Attorney, Agent, or Firm* — McDermott Will & Emery LLP

(57) ABSTRACT

A computer implemented method of combining two knowledge bases, each knowledge base comprising concepts that are linked by relations, the method comprising:
  assigning one of the knowledge bases as a first knowledge base and the other of said knowledge bases as an additional knowledge base;
  matching concepts between the first knowledge base and the additional knowledge base to define mapping relations between concepts of the first and additional knowledge base;
  assessing defined mapping relations to determine if they cause a violation with relations already present in the first or second knowledge base;
  modifying relations within the additional knowledge base to repair violations; and
  storing an extended first knowledge base comprising the first knowledge base, the defined mapping relations and the additional knowledge base with the modified relations within the additional knowledge base.

17 Claims, 7 Drawing Sheets

(56) References Cited

OTHER PUBLICATIONS

Solimando, A., et al., "Detecting and Correcting Conservativity Principle Violations in Ontology-to-Ontology Mappings", (2014), 16 pages.
Stoilos, G., et al., "A String Metric for Ontology Alignment", 2005, 14 pages.
Vandenbussche, P., et al., "Linked Open Vocabularies (LOV): a gateway to reusable semantic vocabularies on the Web", Undefined 1, IOS Press, 2014, pp. 1-5.
Schriml, L., et al., "Disease Ontology: a backbone for disease semantic integration", Nucleic Acids Research 2012, Vo. 40, published onine Nov. 12, 2011, 7 pages.
Meilicke, C., et al., "An Efficient Method for Computing Alignment Diagnoses", 2009, 15 pages.
Meilicke, C., et al,. "Learning Disjointness for Debugging Mappings between Lightweight Ontologies", 2008, 16 pages.
Meilicke, C., "Applying Logical Constraints to Ontology Matching", 2007, 15 pages.
Salvadores, M., "BioPortal as a Database of Linked Biomedical Ontologies and Terminologies in RDF", 8 pages, 2009.
Rappaport, N., "MalaCards: an integrated compendium for disease and their annotation", Database, vol. 2013, Article ID bat081, doi:10.1093/database/bat018, 14 pages.
Konev, B., et al., "The Logical difference problem for description logic terminologies", 2008, 26 pages.
Jimenez-Ruiz, E., et al., "Evaluating Mapping Repair Systems with Large Biomedical Ontologies", 2013, 12 pages.
Jimenez-Ruiz, E., et al., "LogMap 2.0: towards logic-based, scalable and interactive ontology matching", 2011, 2 pages.
Manning, C., et al., "The Stanford CoreNLP Natural Language Processing Toolkit", 2014, 6 pages.
Jimenez-Ruiz, E., "Ontology Integration Using Mappings: Towards Getting the Right Logical Consequences", 2009, 15 pages.
Golbeck, J., et al., "The National Cancer Institute's Thesaurus and Ontology", 2003, 5 pages.
Alchourron, C., et al., "On the Logic of Theory Change: Partial Meet Contraction and Revision Functions", The Journal of Symbolic Logic, vol. 60, No. 2, Jun. 1985, 21 pages.
Faria, D., et al., "Tackling the challenges of matching biomedical ontologies", Journal of Biomedical Semantics (2018), 19 pages.
Ernst, P., et al. "KnowLife: a versatile approach for constructing a large knowledge graph of biomedical sciences", BMC Bioinformatics (2015), 13 pages.
Faria, D., et al., The AgreementMakerLight Ontology Matching System, 2013, pp. 527-541.
Novacek, V.., et al., "Infrastructure for dynamic knowledge integration—Automated biomedical ontology extension using textual resources", Journal of Biomedical Informatics 41 (2008) 816-828.
Lehmann, J., et al., "ORE—A Tool for Repairing and Enriching Knowledge Bases", Nov. 7, 2010, International Conference on computer Analysis of Images and Patterns. CAIP 2017: Computer Analysis of Images and Patterns; pp. 177-193.
Zhang, X., et al., "Forgetting for distance-based reasoning and repair in DL-Lite", Knowledge Based Systems vol. 107, Jun. 15, 2016, pp. 246-260.
Levchuk, G., et al., "Probabilistic graphical models for multi-source fusion from text sources", 2015 IEEE Syposium on Computational Intelligence for Security and Defense Applications (CISDA), IEEE, May 26, 2015, pp. 1-10.
International Search Report for PCT/GB2019/051843, dated Sep. 4, 2019, 4 pages.
Written Opinion for PCT/GB2019/051843 dated Sep. 4, 2019, 10 pages.

* cited by examiner

METHOD AND SYSTEM OF COMBINING KNOWLEDGE BASES

FIELD

Embodiments described herein relate to methods and systems for combining knowledge bases.

BACKGROUND

Today a wealth of knowledge and data are distributed using Semantic Web standards. For example, knowledge bases exist for various subjects like geography, multimedia, security, geometry, and more. Especially in the (bio)medical domain several sources like SNOMED, NCI, FMA have been developed in the last decades and these are distributed in the form of OWL ontologies.

These can be aligned and integrated in order to create one large medical Knowledge Base. However, an important issue is that the structure of these ontologies may be profoundly different and hence naively integrating them can lead to incoherences or changes in their original structure which may affect applications.

DETAILED DESCRIPTION

Figure 1:
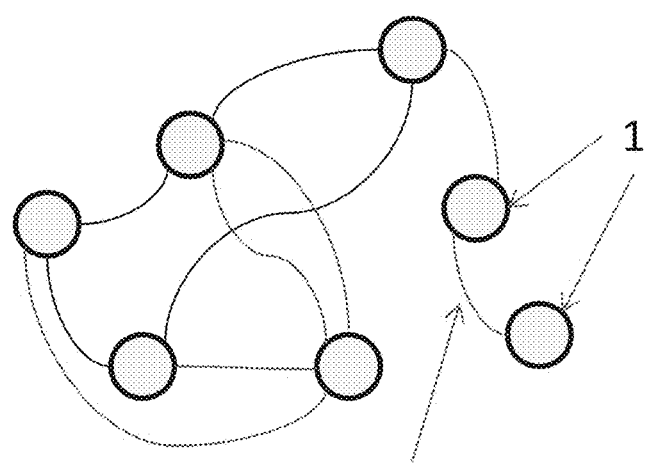
FIG. 1 is a schematic representation of an ontology.

In an embodiment, a computer implemented method of combining two knowledge bases is provided, each knowledge base comprising concepts that are linked by relations, the method comprising:

assigning one of the knowledge bases as a first knowledge base and the other of said knowledge bases as an additional knowledge base;

matching concepts between the first knowledge base and the additional knowledge base to define mapping relations between concepts of the first and additional knowledge base;

assessing defined mapping relations to determine if they cause a violation with relations already present in the first or second knowledge base;

modifying relations within the additional knowledge base to repair violations and storing an extended first knowledge base comprising the first knowledge base, the defined mapping relations and the additional knowledge base with the modified relations within the additional knowledge base.

In the above, relations are used to define and express axioms between the concepts. In the following description, the terms relation and axiom are used interchangeably.

The above provides a framework and novel approach for integrating independently developed ontologies. Starting from an initial seed ontology which may already be in use by an application, new sources are used to iteratively enrich and extend the seed one. To deal with structural incompatibilities a novel fine-grained approach which is based on mapping repair and alignment conservativity is provided. This is then formalised to provide an approximate but practical algorithm.

Further, the methods described herein make certain assumptions concerning the nature of incompatibilities that allows their repair in an efficient manner compared to that of state of the art ontology integration systems.

The disclosed system provides an improvement to computer functionality by allowing computer performance of a function not previously performed by a computer. Specifically, the disclosed system provides for combining two (or more) ontologies and, attempts to repair conflicts by first attempting to drop relations within one of the ontologies as opposed to dropping mappings between the two ontologies. This has several technological advantages for services built on top of the integrated ontologies, e.g. chat bots, diagnostic engines, and more. First, services that operated with one of the ontologies can continue to work in the same way and at the same level of quality as before. Second, services that interoperate using one ontology can continue to interoperate at the same level over the integrated ontology. Third, by retaining as much of the mappings as possible the size of the integrated ontology is kept small and makes it easier to store, manage, update, as well as scalable to query and process it. Instead, dropping of mappings causes at least the following three issues. First, it prevents services that worked with one ontology from continuing to work well with the combined ontology as the dropping of mappings results in more duplication on the label information between classes and ambiguity on which entities of the combined ontology should be used by services. Second, this in turn can cause a decrease at the level of interoperation between services that communicated using one ontology since in the combined one different unlinked entities may be selected by each one of them. Third, duplication implies that the size of the integrated ontology grows disproportionally with its actual net content making it hard to store, process, and query in an efficient and scalable way.

To illustrate the above technological advantages more explicitly:

1) some service like a chatbot works well on some ontology and then after integration by dropping mappings its quality may decrease because of duplication and because it is not clear anymore which entities the chatbot should pick.

2) two different services operating on the same ontology interoperate well as e.g., both use concept Cxx to refer to the real world entity "Malaria". However, after integration their interoperation drops since now there may be >1 entities (concepts/classes) for the notion of "Malaria"

3) Keeping as many mappings as possible the size of the integrated ontology is kept as small as possible and hence it is made easier to process it and algorithms can still scale, otherwise, efficiency issues would start to come up.

The embodiments described herein provide a simplified model for the causes of a conflict where the conflict is assumed to be caused by exactly two mappings. This simplified model also provides a framework for repairing the conflict in an efficient manner. Thus, the embodiments described herein also address a technical problem tied to computer technology, namely the technical problem of reducing the time and computing power required to combine two knowledge bases. The disclosed system solves this technical problem by using an approximate and simplified model for the causes of conflicts and resolves conflicts using this model.

The above also provides an experimental evaluation and comparison with state-of-the-art ontology integration systems that take into account the structure and coherency of the integrated ontologies but which prefer to drop mappings obtaining encouraging results.

Identifying the common entities between these vocabularies and integrating them is beneficial for building ontology-based applications as one could unify complementary information that these vocabularies contain building a "complete" Knowledge Base (KB).

The problem of computing correspondences (mappings) between different ontologies is referred to as ontology matching or alignment. Besides classes with their respective labels, ontologies usually bring a class hierarchy and depending on how they have been conceptualised they may exhibit significant incompatibilities. For example, in NCI proteins are declared to be disjoint from anatomical structures whereas in FMA proteins are subclasses of anatomical structures. In this case a naive integration can lead to many undesired logical consequences like unsatisfiable classes and/or changes in the structure of the initial ontologies. It is possible to partially mitigate these problems by employing conservative alignment techniques and mapping repair.

These notions dictate that the mappings should not alter the original ontology structure or introduce unsatisfiable concepts. If they do, then a so-called violation occurs which needs to be repaired by discarding some of the mappings. Unfortunately, dropping mappings may not always be the best way to repair a violation as it introduces yet another problem which is the increase of ambiguity and redundancy.

For example, if one drops all mappings between NCI and FMA proteins (due to their structural incompatibilities), then the integrated ontology will contain at least two classes for the same real-world entity. As discussed this creates at least two major problems. First, it causes an increase in the size of the integrated ontology raising technological issues related to storage, querying, and scalability of the services built on top of the integrated ontology. Second, duplication of entities with overlapping label information causes ambiguity and decreases interoperability between the services that use the KB.

To provide an efficient method of assessing and repairing violations, in an embodiment, it is assumed that a violation stems from exactly two mappings which map concepts between the first and second knowledge bases. By modelling the violation in this way, more efficient methods can be provided for its repair and algorithms can scale over large Knowledge Bases.

In an embodiment, violations that occur due to relations induced (by the mappings) in the first knowledge base are treated differently to violations that occur due to relations induced by the mappings in the second knowledge base.

For violations with the first knowledge base, repair might be possible via modifying relations within the additional knowledge base by removing an axiom in the additional knowledge base.

In some situations, there may be at least two options for repairing a violation and each option comprises removing an axiom, in such a situation, the violation can be repaired by removing the axiom that causes, for example, the lowest amount of changes to the first knowledge base.

Some violations that are due to relations induced by mappings in the second knowledge base may not need to be repaired. Therefore, in some embodiments, it is determined whether the violation needs to be repaired.

For example, if two concepts in the second knowledge base to which mappings cause a violation have a common descendant concept, this violation can be ignored. Also, a similarity measure may be taken between two concepts in the second knowledge base to which mappings cause a violation. If these two concepts are determined to be similar, then it might not be necessary to repair the violations.

Also, in an embodiment, if two concepts in the second knowledge base to which mappings cause a violation are disjoint, the violations can be repaired by either removing the disjointness axiom or removing a mapping.

In a further embodiment, the method comprises separating mappings that cause a conflict into two groups, wherein: the first group comprises mappings where two or more concepts from one knowledge base are mapped to a single concept in the other knowledge base; and the second group from mappings comprising the remaining mappings not in the first group.

In the above, the mapping relations between the first and additional knowledge bases may be modified to resolve conflicts for the first group.

The two knowledge bases may be medical knowledge bases.

In an embodiment, the two knowledge bases may be stored in memory in the form of triple stores.

Using the above embodiments, additional ontologies are integrated in order to make the ontology which the services are already using more rich in medical information and (potentially) improve them. For example, there may be a KB that is currently missing disease-symptom relations and this information may be encoded in some 3rd party ontology. Hence, to bring these relations in there is a need to integrate this 3rd party ontology. Then, a diagnostic engine can have access to this set of disease-symptom relations and extend its functionality. Another example is text annotation where the KB needs to be rich in label and synonym information of classes. In particular concepts are needed to also contain labels related to layman language for medical entities, e.g., the class for "Abdomen" needs to contain "tummy" as a synonym. For that purpose a CHV ontology or the like that does contain such layman language can be integrate with the existing knowledge base. So if a user types "my tummy hurts" without the CHV ontology it is not possible to annotate that "tummy" in user text is the medical concept Cxxxx which is the concept intending to denote "abdomen".

Thus, in a further embodiment, a method of proving a response to a query is provided, the method comprising:
using a probabilistic graphical model (PGM) to query a knowledge base, wherein the knowledge base is constructed from at least two knowledge bases combined as recited above. The PGM may be linked to a chat bot.

In an embodiment, a computer system is provided that is adapted to combine two knowledge bases, each knowledge base comprising concepts that are linked by relations, the method comprising, the computer system comprising:
storage, said storage comprising a first and second knowledge base; and
a processor,
the processor being configured to:
assign one of the knowledge bases as a first knowledge base and the other of said knowledge bases as an additional knowledge base;
match concepts between the first knowledge base and the additional knowledge base to define mapping relations between concepts of the first and additional knowledge base;
assess defined mapping relations to determine if they cause a violation with relations already present in the first or second knowledge base;
modify relations within the additional knowledge base to repair violations; and
store in said storage an extended first knowledge base comprising the first knowledge base, the defined mapping relations and the additional knowledge base with the modified relations within the additional knowledge base.

FIG. 1 is a simple schematic of a knowledge base/ontology. The terms ontology and knowledge base will be used interchangeably. In the ontology, various concepts 1 are linked by various relations 3.

Figure 2A:
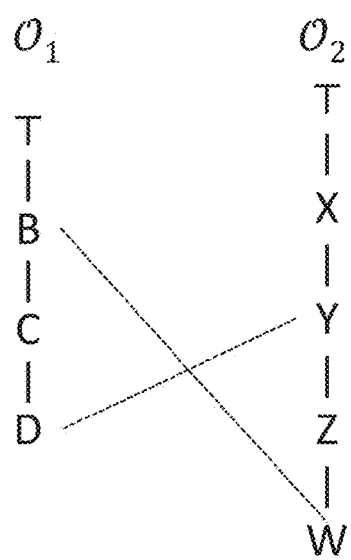
FIG. 2(a) is a schematic of two simplified ontologies with mappings.

FIG. 2(a) shows a schematic of some of the issues when combining ontologies. FIG. 2(a) will be discussed in detail later in the application. Here, it can be seen that two ontologies $\mathcal{O}_1$ and $\mathcal{O}_2$ have mappings between them. In this context, it is assumed that the two mappings are the simplified situation where a concept in one ontology is equivalent to a concept in the other ontology.

Figure 2B:
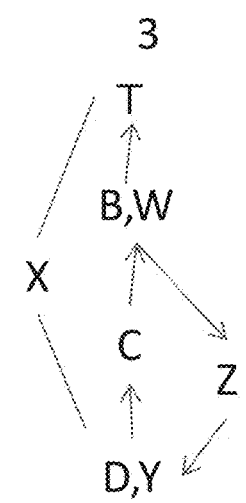
FIG. 2(b) is a naïve integration of the ontologies of FIG. 2(a)

However, these two mappings cause an issue for combining the ontologies as if B and W are treated as equivalent and Y and D are treated as equivalent then these two mappings give rise to incompatible relations between the two ontologies. This situation is shown in FIG. 2(b) where a loop is formed.

Figure 2C:
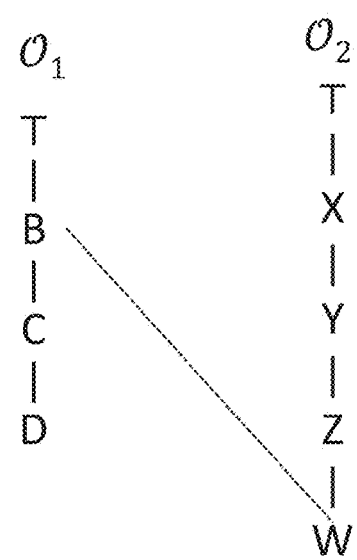
FIG. 2(c) is a schematic showing how a mapping of FIG. 2(a) can be removed.

One way to resolve this is to remove one of the mappings as shown in FIG. 2(c). However, this is not an effective method of combining the ontologies as there will be equivalent concepts duplicated within the ontology (e.g., concepts C and Y will have overlaps between their labels, which is the reason why the (dropped) mapping was computed in the first place).

Figure 2D:
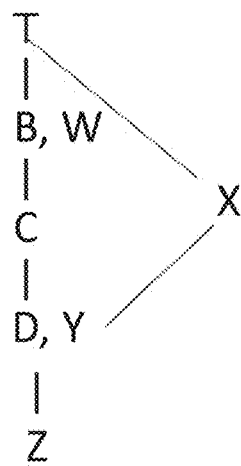
FIG. 2(d) is a schematic of a combined ontology showing one method for repairing a violation shown in FIG. 2(a)
Figure 2E:
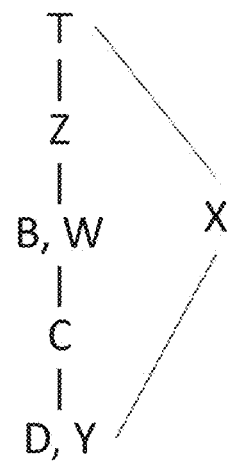
FIG. 2(e) is a schematic of a combined ontology showing a different method for repairing a violation shown in FIG. 2(a)

FIGS. 2(d) and (e) show alternate ways of combining these ontologies in accordance with embodiments of the invention, by changing the axioms within the ontology as opposed to just dropping the mapping. These examples will be discussed in more detail later.

Figure 3:
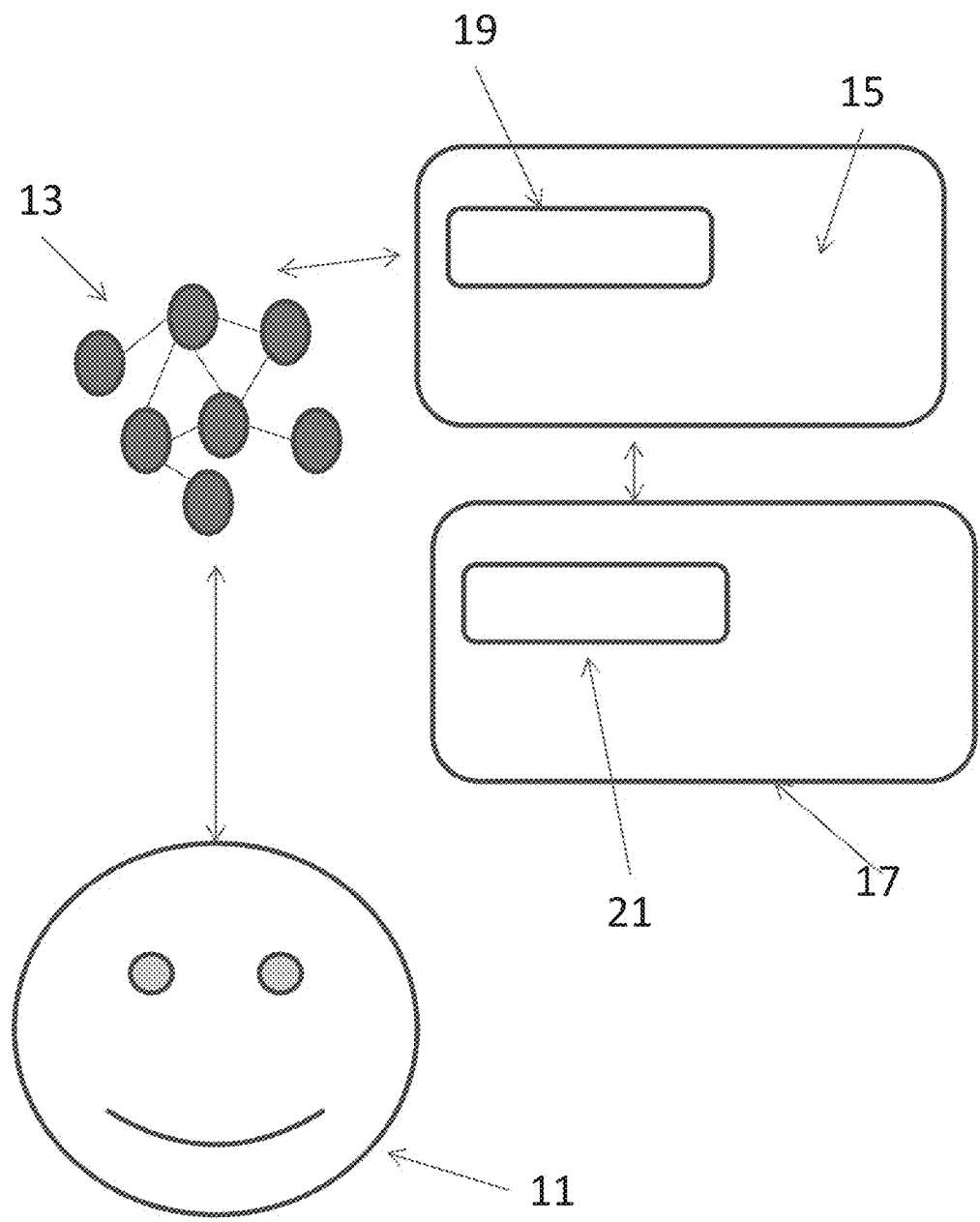
FIG. 3 is a schematic of a chatbot system using a combined ontology.

Before considering details of how the problems briefly described above in relation to FIG. 2 can be addressed, FIG. 3 schematically shows the difficulties of just dropping a mapping in a practical example.

In FIG. 3, a chat bot 11 is provided. The chat bot 11 can receive a query from a patient, for example, requesting information about a medical condition or providing information concerning their symptoms and requested a diagnosis.

The chat bot with interface with a diagnostic engine 13, for example, one that is using a probabilistic graphical model (PGM). The PGM 13 initially obtained some data from knowledge base 15. However, it is desirable to add second knowledge base 17 to knowledge base 15 in order to enrich 17 with additional knowledge about, e.g., diseases, genes, drugs, chemicals, and the like. Besides additional concepts, knowledge base 15 comprises in addition with many concepts, for example, concept 19, that already exist in the second knowledge base 17, for example, concept 21.

For example, the first knowledge base may be a full medical ontology, for example, SNOMED whereas the second knowledge base may have more information concerning possible pharmaceuticals.

However, if the mapping between concept 19 and concept 21 is dropped, then duplicate answers may be provided. Many chat bots may be configured to only take the first answer given and therefore vital information can be lost.

In the description that will follow, Description Logic notation will be used. An annex is provided at the end of this description that gives more detail on some of the symbols and terms used herein.

For a set of real numbers S, $\oplus$S will be used to denote the sum of its elements.

IRI stands for Internationalised resource identifier which is a string of characters identifying a resource. An ontology prefix is an alias for an IRI that would be used as a prefix to form the IRIs of entities within an ontology. The ontology prefix is defined within the file that specifies an ontology. An example of an ontology prefix declaration is the following:

PREFIX onto 1: https://bbl.health/ which defines the ontology prefix "ontol" to be an alias of the IRI https://bbl.health/. Then for C a class we can write ontol:C denoting the class https://bbl.health/C. Consequently, for different ontology prefixes $p_1 \neq p_2$, $p_1$: C and $p_2$: C denote different classes. In the following, if it is not important to specify in which ontology a class belongs then we will simply write C instead of o:C for o the ontology prefix.

For an ontology $\mathcal{O}$, Sig($\mathcal{O}$) is used to denote the set of classes that appear in $\mathcal{O}$. Given an ontology $\mathcal{O}$ it can be assumed that all classes C in $\mathcal{O}$ have at least one triple of the form $\langle$ C skos: prefLabel v$\rangle$ and zero or more triples of the form $\langle$ C skos: altLabel v$\rangle$. For a given class C function pref(C) returns the string value v in the triple $\langle$ C skos: prefLabel v$\rangle$. An ontology is called coherent if every C∈Sig($\mathcal{O}$) with C≠⊥ is satisfiable.

The above uses the so-called Simple Knowledge Organisation System (SKOS) which is a common data model for sharing and linking knowledge organisation systems via the Semantic Web. The term skos:preflabel indicates a preferred natural language label for a concept whereas the term skos:altlabel indicates an alternative natural language label for a concept.

A Knowledge Base can be considered to be similar to that of an ontology, i.e., a set of axioms describing the entities of a domain. In the following, the term "Knowledge Base" ($\mathcal{KB}$) is loosely used to mean a possibly large ontology that has been created by integrating various other ontologies but, formally speaking, a $\mathcal{KB}$ is an OWL ontology.

Ontology matching (or ontology alignment) is the process of discovering correspondences (mappings) between the entities of two ontologies $\mathcal{O}_1$ and $\mathcal{O}_2$. To represent mappings a formulation will be used where a mapping between $\mathcal{O}_1$ and $\mathcal{O}_2$ is a 4-tuple of the form $\langle$ C, D, ρ, n$\rangle$ where C∈Sig($\mathcal{O}_1$), D∈Sig($\mathcal{O}_2$), ρ∈{≡, ⊑, ⊒} is the mapping type, and n∈(0; 1] is the confidence value of the mapping. (Here, the nomenclature means from 0 exclusive to 1 inclusive). Moreover, the mappings are interpreted as DL axioms—that is $\langle$ C, D, ρ, n$\rangle$ can be seen as the axiom c ρ d with the degree attached as an annotation. Hence, for a mapping $\langle C, D, \rho, n \rangle$ the notation $\mathcal{O} \cup \{\langle C, D, \rho \rangle\}$ means $\mathcal{O} \cup \{C \rho D\}$, while a set of mappings $\mathcal{M}$, $\mathcal{O} \cup \mathcal{M}$ denotes the set $\mathcal{O} \cup \{m | m \in \mathcal{M}\}$. When not relevant and for simplicity $\rho$ and n will often be omitted in this description and just $\langle C, D \rangle$ will be written. A matcher is an algorithm that takes as input two ontologies and returns a set of mappings.

In embodiments described herein, KBs can be constructed by integrating existing, complementary, and possibly overlapping ontologies. For example, in the biomedical domain, ontologies for diseases, drugs, drug side-effects, genes, and so on, exist that can be integrated in order to build a large medical KB.

In an embodiment, before putting two sources together overlapping parts are discovered and mappings are established between their equivalent entities.

Example 1

Consider an ontology-based medical application that is using the SNOMED ontology $\mathcal{O}_{snmd}$ as a KB. Although SNOMED is a large and well-engineered ontology it is still missing medical information like textual definitions for all classes as well as relations between diseases and symptoms.

For example, for class the notion of "Ewing Sarcoma" SNOMED only contains the axiom snmd:EwingSarcoma $\sqsubseteq$ snmd: Sarcoma and no relations to signs or symptoms. In contrast, the NCI ontology $\mathcal{O}_{nci}$ contains the following axiom about this disease:

nci:EwingSarcoma$\sqsubseteq \exists$nci:mayHaveSymptom:nci:Fever

Ontology matching can be used to establish links between the related entities in $\mathcal{O}_{snmd}$ and $\mathcal{O}_{nci}$ and then the two sources can be integrated in order to enrich the KB. More precisely, using a matching algorithm it is possible to identify the following mappings:

$m_1 = \langle$ snmd: EwingSarcoma, nci: EwingSarcoma, $\equiv \rangle$ $m_2 = \langle$ snmd: Fever, nci: Fever, $\equiv \rangle$ and hence replace the KB with $\mathcal{O}'_{snmd} := \mathcal{O}_{snmd} \cup \mathcal{O}_{nci} \cup \{m_1, m_2\}$. Then, $\mathcal{O}'_{snmd}$ contains the knowledge that "Ewing sarcoma may have fever as a symptom".

Unfortunately, naively integrating ontologies can lead to unexpected consequences like, introducing unsatisfiable classes or structural changes to the input ontologies.

Example 2

Consider again the SNOMED and NCI ontologies. Both ontologies contain classes for the notion of "soft tissue disorder" and "epicondylitis". Hence, it is reasonable for a matching algorithm to compute the following mappings:

$m_1 = \langle$ snmd: SoftTissueDisorder, nci: SoftTissueDisorder, $\equiv \rangle$ $m_2 = \langle$ snmd: Epicondylitis, nci: Epicondylitis, $\equiv \rangle$ However, in NCI $\mathcal{O}_{nci} \vDash$ nci:Epicondylitis $\sqsubseteq$ nci:SoftTissueDisorder while in SNOMED $\mathcal{O}_{snmd} \nvDash$ snmd:Epicondylitis $\sqsubseteq$ snmd:SoftTissueDisorder. Hence, the integrated ontology will produce:

$\mathcal{O}_{snmd} \cup \mathcal{O}_{nci} \cup \{m_1, m_2\} \vDash$ snmd::Epicondylitis $\sqsubseteq$ snmd:SoftTissueDisorder which introduces a relation between classes of $\mathcal{O}_{snmd}$ that did not originally hold and which can have a significant impact on the services of an application which are already based on the structure of $\mathcal{O}_{snmd}$.

The amount of such structural changes can be captured by the notion of logical difference. For performance reasons an approximate version of logical difference will be used.

Definition 1 (logical difference). Let A,B be atomic classes (including $\top$, $\bot$), let $\Sigma$ be a signature (set of entities) and let $\mathcal{O}$ and $\mathcal{O}'$ be two OWL 2 ontologies. The approximation of the $\Sigma$-deductive difference between $\mathcal{O}$ and $\mathcal{O}'$ (denoted $\text{diff}_\Sigma^\sim(\mathcal{O}, \mathcal{O}')$) as the set of axioms of the form A $\sqsubseteq$ B satisfying: (i) A, B $\in \Sigma$, (ii) $\mathcal{O} \nvDash$ A $\sqsubseteq$ and (iii) $\mathcal{O}' \vDash$ A $\sqsubseteq$ B.

Using the above logical difference the notion of conservative alignment can be used which dictates that for two ontologies $\mathcal{O}_1$ and $\mathcal{O}_2$ and for $\Sigma_1 = \text{Sig}(\mathcal{O}_1)$ and $\Sigma_2 = \text{Sig}(\mathcal{O}_2)$ the set of mappings $\mathcal{M}$ must be such that $\text{diff}_{\Sigma_1}^\sim(\mathcal{O}_1, \mathcal{O}_1 \cup \mathcal{O}_2 \cup \mathcal{M})$ and $\text{diff}_{\Sigma_2}^\sim(\mathcal{O}_2, \mathcal{O}_1 \cup \mathcal{O}_2 \cup \mathcal{M})$ are empty. An axiom belonging to either of these sets is called a (conservativity) violation and can be "repaired" by removing mappings form the initially computed sets.

Algorithm 1 is a Knowledge Base construction algorithm.

| Algorithm 1 KnowledgeBaseConstruction($\mathcal{KB}$, $\mathcal{O}$, Config) |
|---|
| Input: The current KB $\mathcal{KB}$, a new ontology $\mathcal{O}$ and a configuration Config. |
| 1: Mappings := $\emptyset$ |
| 2: for all matcher : Config.Align.Matchers do |
| 3:   for all $\langle C, D, \rho, n \rangle \in$ matcher ($\mathcal{KB}$, $\mathcal{O}$) do |
| 4:     Mappings := Mappings $\cup$ $\{\langle C, D, \rho, n, \text{matcher}\rangle\}$ |
| 5:   end for |
| 6: end for |
| 7: $\mathcal{M}_f :=\emptyset$ |
| 8: w = $\oplus$\{matcher.w \| matcher $\varepsilon$ Config.Align.Matchers\} |
| 9: for all $\langle C, D, \rho, \_, \_\rangle \varepsilon$ Mappings such that no $\langle C, D, \rho, n\rangle$ exits in $\mathcal{M}_f$ do |
| 10:   n := $\oplus\{n_i \times \text{matcher.w} \| \langle C, D, \rho, n_i, \text{matcher}\rangle \varepsilon \mathcal{M}\}$/w |
| 11:   if n $\geq$ Config.Align.thr then |
| 12:     $\mathcal{M}_f := \mathcal{M}_f \cup \{\langle C, D, \rho, n\rangle\}$ |
| 13:   end if |
| 14: end for |
| 15: $\langle \mathcal{O}, \mathcal{M}\rangle$ := postProcessNewOntoStructure($\mathcal{KB}, \mathcal{O}, \mathcal{M}_f$, Config) |
| 16: $\langle \mathcal{O}, \mathcal{M}\rangle$ := postProcessKBStructure($\mathcal{KB}, \mathcal{O}, \mathcal{M}_f$, Config) |
| 17: return $\mathcal{KB} \cup \mathcal{O} \cup \mathcal{M}_f$ |

Figure 4:
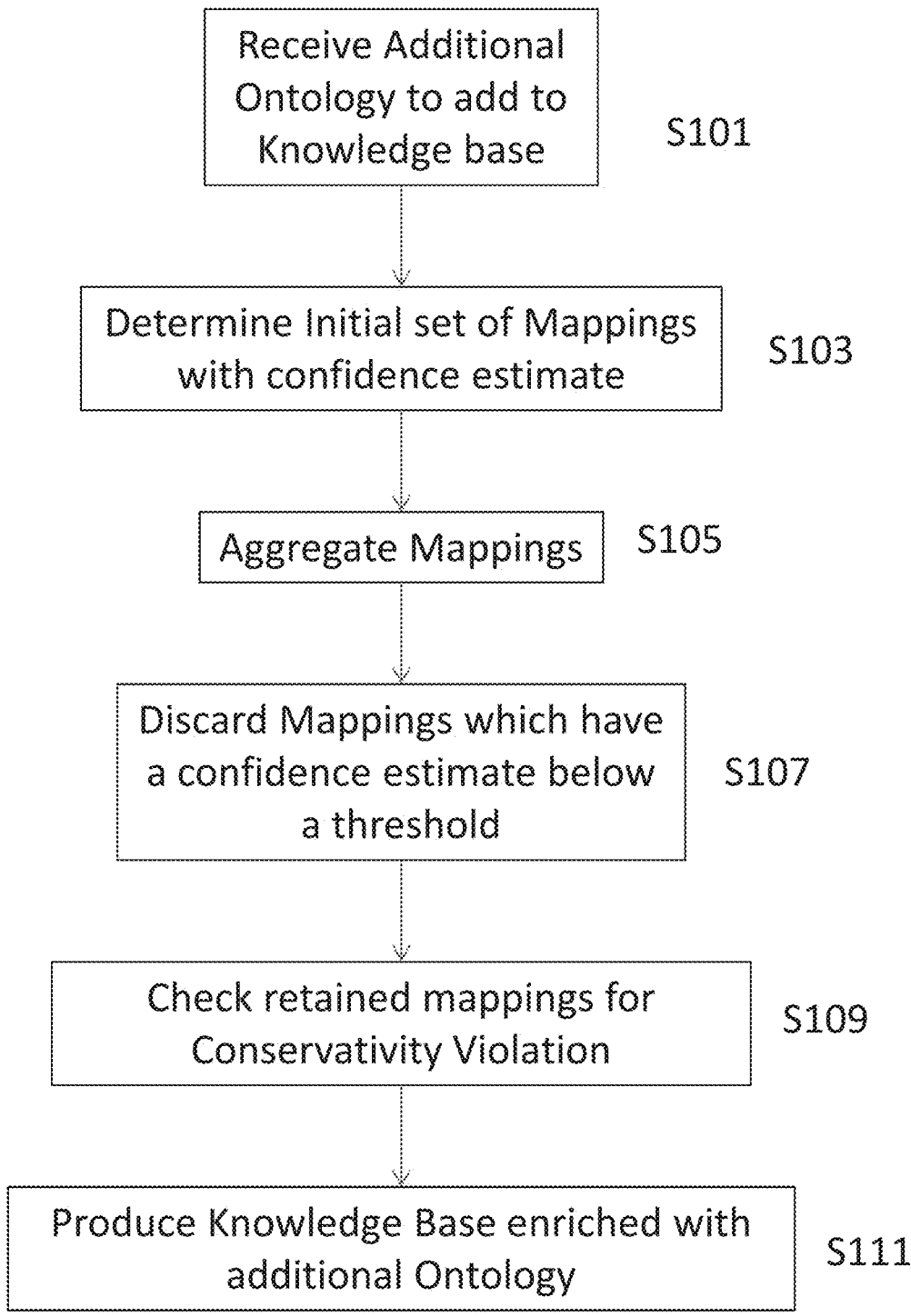
FIG. 4 is a flow chart of a method in accordance with an embodiment of the present invention.

FIG. 4 is a flow chart of a method in accordance with an embodiment of the present invention which follows algorithm 1. Here, a second knowledge base ontology (additional ontology) is added to an existing Knowledge Base.

In step S101, a computer system receives the additional ontology to add to the existing KB which will be used to enrich and extend $\mathcal{KB}$ and a configuration Config. The configuration object is used to tune and change various parameters like thresholds etc., many of which will be described later in the description.

In summary, the algorithm first applies a set of matchers in order to compute a set of mappings between $\mathcal{KB}$ and $\mathcal{O}$. The set of matchers to be used is specified in the configuration object (Config.Align.Matchers) and each of them has a different weight assigned (matcher: $w$). After all matchers have finished, the mappings are aggregated in step S105 and a threshold is applied (Config.Align.thr) in order to keep only mappings with high a confidence in step S107.

These mappings are then further processed since they may cause conservativity violations in step S109.

In algorithm 1 there are two functions, namely postProcessNewOntoStructure and postProcessKBStructure which process these mappings to produce a knowledge base enriched with the additional ontology in step S111.

The following description will concentrate on steps S109 and S111 in more detail.

One possible approach to resolve conservativity violations in step S109 is to remove mappings. However, this approach may introduce other issues such as having distinct classes with a large overlap in their labels, hence introducing redundancy and ambiguity.

Assume for instance, that in Example 2 the mapping $m_2$ is dropped. Then, the integrated ontology will contain two different classes for the real-world notion of "epicondylitis" (i.e., nci:Epicondylitis and snmd:Epicondylitis) each with overlapping labels. Subsequently, a service that is using the former class internally cannot interoperate with a service that is using the latter as there is no axiom specifying that the two classes are actually the same.

In an embodiment, instead of removing mappings, another way to repair a violation is by removing axioms from one of the input ontologies.

Example 3

Consider again Example 2 where $\mathcal{O}_{snmd}$ serves as the current version of the application KB. Instead of computing $\mathcal{KB}_1^{int} := \mathcal{O}_{snmd} \cup \mathcal{O}_{nci} \cup \{m_1 m_2\}$ as in Example 2 the following is computed:

$\mathcal{KB}_2^{int} := \mathcal{KB}_1^{int} \setminus \{\text{nci: Epicondylitis} \sqsubseteq \text{SoftTissueDisorder}\}$ Then, $\mathcal{KB}_2^{int} \not\models$ snmd: Epicondylitis $\sqsubseteq$ snmd: SoftTissueDisorder and hence $\text{diff}_{Sig(\mathcal{O}_{snmd})}^{\sim}(\mathcal{O}_{snmd}, \mathcal{KB}_2^{int}) = \emptyset$ as desired.

This approach is reasonable if it is assumed that an application is already using the current Knowledge Base and the role of new ontologies is to enrich and extend it with new information but without altering its structure. Then, parts of the new ontology that cause violations can be dropped.

However, not all violations can be repaired by removing axioms from $\mathcal{O}_2$. This is the case for mappings of higher multiplicity, i.e., those that map two different classes of one ontology to the same class in the other.

Example 4

Consider again ontology $\mathcal{O}_{snmd}$ and $\mathcal{O}_{nci}$. SNOMED contains classes Eczema and AtopicDermatitis whereas NCI contains class Eczema that also has "Atopic Dermatitis" as an alternative label. Hence, a matching algorithm could create two mappings of the form:

$m_1 = \langle$ snmd: Eczema, nci: Eczema, $\equiv \rangle$
$m_2 = \langle$ snmd: AtopicDermatitis, nci: Eczema, $\equiv \rangle$ which imply that snmd:Ezcema and snmd:AtopicDermatitis are equivalent although this is not the case in $\mathcal{O}_{snmd}$.

In these cases it is clear that the only way to repair such violations is by altering the mapping set. One approach would be to drop one of the two mappings or perhaps even change their type from $\equiv$ to $\sqsubseteq$ or $\sqsupseteq$ and thus, in an embodiment, the actual choice is case dependent.

In the previous example, one may decide that SNOMED is more granular than NCI in the sense that Atopic Dermatitis is a type of Eczema whereas the NCI term captures a more general notion. Hence, they may decide to change the mappings to $\langle$ snmd: Eczema, nci: Eczema, $\sqsubseteq \rangle$ and $\langle$ snmd: AtopicDermatitis, nci: Eczema, $\sqsubseteq \rangle$. The above shows an example of an extension for a safe ontology.

Definition 2 (safe extension). Let $\mathcal{O}_1$ and $\mathcal{O}_2$ be two ontologies and let $\mathcal{M}$ be a set of mappings computed between them. The safe extension of $\mathcal{O}_1$ w.r.t. $\mathcal{O}_2$, $\mathcal{M}$ is a pair $\langle \mathcal{O}', \mathcal{M}' \rangle$ such that $\mathcal{O}' \subset \mathcal{O}_2$, $\mathcal{M}' \subset \mathcal{M}$ and $\text{diff}_\Sigma^{\sim}(\mathcal{O}_1, \mathcal{O}_1 \cup \mathcal{O}' \cup \mathcal{M}') = \emptyset$ for $\Sigma = \text{Sig}(\mathcal{O}_1)$.

The pair of an empty ontology and set of mappings $(\langle \emptyset, \emptyset \rangle)$ is a trivial safe extension but one is usually interested in some maximal safe extension.

Definition 3 (safe maximal extension). Let $\mathcal{O}_1$ and $\mathcal{O}_2$ be two ontologies and let $\mathcal{M}$ be a set of mappings computed between them. A safe extension $\langle \mathcal{O}', \mathcal{M}' \rangle$ of $\mathcal{O}_1$ w.r.t. $\mathcal{O}_2$, $\mathcal{M}$ is maximal if no safe extension $\langle \mathcal{O}'', \mathcal{M}'' \rangle$ exists such that $\mathcal{O}'' \subset \mathcal{O}'$ or $\mathcal{M}'' \subset \mathcal{M}'$. Using the above concepts, the violations are repaired. However, approximations are necessary to allow for efficient repair of these violations and scale on large input Knowledge Bases.

In an embodiment, conflicts are identified and repaired by taking one ontology at a time. In the embodiment described with reference to FIG. 6, the second ontology is first analysed. In the below description with reference to FIG. 5, the repairing of the first ontology will be described.

The algorithm described below and with reference to FIG. 5 accepts as input two ontologies $\mathcal{O}_1$, $\mathcal{O}_2$ with mappings $\mathcal{M}$ and returns a subset of $\mathcal{O}_2$ and a subset of $\mathcal{M}'$.

---

Algorithm 2 postProcessKBStructure ($\mathcal{O}_1, \mathcal{O}_2, \mathcal{M}$, Config)

Input: Two coherent ontologies $\mathcal{O}_1, \mathcal{O}_2$ and a set of mappings $\mathcal{M}$ between them.
1: $\mathcal{M}_{m-1} := \{\langle C_i, D \rangle \mid \langle C_i, \rangle, \langle C_j, D \rangle\} \subseteq \mathcal{M} \hat{} C_i \neq C_j\}$.
2: $\mathcal{M}' := \mathcal{M} \setminus \mathcal{M}_{m-1}$
3: for all D $\epsilon$ Sig($\mathcal{O}_2$) do
4: $\mathcal{M}' := \mathcal{M}' \cup$ disambiguate-m-1($\{\langle C_i, D \rangle \mid \langle C_i, D \rangle \epsilon \mathcal{M}_{m-1}\}$, Config)
5: end for
6: Exclusions := $\emptyset$
7: ConflictSets := $\{\{m_1, m_2\} \mid \mathcal{O}_1 \cup \mathcal{O}_2 \cup \{m_1, m_2\} \models A \sqsubseteq B, \mathcal{O}_1 \not\models A \sqsubseteq B\}$
8: for all $\{\langle A, A \rangle, \langle B, B \rangle\} \epsilon$ ConflictSets with $\mathcal{O}_2 \models_{rdfs} A' \sqsubseteq B'$ do
9: Exclusions := Exclusions $\cup \{A' \sqsubseteq E \mid A' \sqsubseteq E \epsilon \mathcal{O}_2, \mathcal{O}_2 \models_{rdfs} E \sqsubseteq B'\}$
10: end for
11: return $\langle \mathcal{O}_2 \setminus$ Exclusions, $\mathcal{M}' \rangle$

---

The algorithm first processes mappings of higher multiplicity w.r.t. entities in $\mathcal{O}_1$ in step S201. In other words, the algorithm looks for multiple concepts in the seed ontology that map to a single concept in the second ontology. To achieve this, a function disambiguate-m-1 is used in step S203.

Definition 4 (disambiguate-m-1). Given a set of mappings $\mathcal{M} = \{\langle C_1 D \rangle, \langle C_2 D \rangle \ldots \langle C_n D \rangle\}$, function disambiguate-m-1 returns a set $\mathcal{M}' \subseteq \mathcal{M}$ that satisfies the following property: it contains either a single mapping of the form $\langle C_i, D, \equiv \rangle$ or only mappings of the form $\langle C_i, D, \sqsubseteq \rangle$.

As mentioned before a concrete implementation of this function is case specific and in an embodiment, different strategies can be followed that depend on the input ontology.

In an embodiment, disambiguate-m-1 and disambiguate-1-m (the latter used later in Algorithm 3) the following strategy is used:

Let strSim be any string similarity metric that accept two strings and return a number taken from some range $[-m,n]$ that indicates how similar the two strings are. Such similarity metrics an be built using well known metrics like the Levenshtein distance, Jaro-Winkler distance, iterative-substring (ISub), and more. For a set of mappings $\{\langle C_1, D\rangle, \langle C_2, D\rangle \ldots \langle C_n, D\rangle\}$ and some real-value threshold Config:Disamb:th, if $i\in[1; n]$ exists such that the following two conditions hold:

1. $strSim(pref(Ci); pref(D)) > strSim(pref(Cj); pref(D))$ for every $j \neq i$ and
2. $strSim(pref(Ci); pref(D)) \geq Config:Disamb:th$ then return $\langle C_i, D\rangle$ Afterwards, the algorithm attempts to compute a subset of relations from $\mathcal{O}_2$ that need to be excluded in order to compute a safe extension of $\mathcal{O}_1$. First, in step S205, pairs of mappings that cause a conflict in $\mathcal{O}_1$ are identified as conflict sets:

ConflictSets:=$\{\{m_1, m_2\} | \mathcal{O}_1 \cup \mathcal{O}_2 \cup \{m_1, m_2\} \models A \sqsubseteq B, \mathcal{O}_1 \not\models A \sqsubseteq B\}$ For efficiency reasons the algorithm is based on the assumption that logical differences of the form $A \sqsubseteq B$ stem from exactly two mappings $\{m_1, m_2\}$ which map classes A and B (for which $\mathcal{O}_1 \not\models A \sqsubseteq B$) to classes A' and B' in $\mathcal{O}_2$ (for which a path of SubClassOf axioms in $\mathcal{O}_2$ exists ($\models_{rdfs}$)), hence implying changes in the structure of $\mathcal{O}_1$.

For every such pair of mappings the algorithm picks to remove from $\mathcal{O}_2$ some axiom of the form $A' \sqsubseteq E$ (termed an "exclusion"), i.e., it tries in some sense to remove the "weakest" axiom from $\mathcal{O}_2$. This choice is motivated by belief revision and the principle of minimal change.

Note, however, that the above assumption does not always hold. Consequently, the algorithm may not be able to repair all violations. However, in practice it does succeed in most cases and moreover, the algorithm based on this assumption is of low-complexity and very efficient.

Example 5 below is used to explain the identification of an exclusion and possible repair in more detail.

Example 5

Consider for example the following two ontologies:
$\mathcal{O}_1 = \{D \sqsubseteq C, C \sqsubseteq B\}$
$\mathcal{O}_2 = \{W \sqsubseteq Z, Z \sqsubseteq Y, Y \sqsubseteq X\}$
and assume the set of mappings $\mathcal{M} = \{m_1, m_2\}$ where $m_1 = \langle D, Y\rangle$ and $m_1 = \langle B, W\rangle$. Clearly, for $\Sigma = Sig(\mathcal{O}_1)$ there is $B \sqsubseteq D \in diff_\Sigma^-(\mathcal{O}_1, \mathcal{O}_1 \cup \mathcal{O}_2 \cup \mathcal{M})$ and this violation can be repaired by either removing $ax_1 = W \sqsubseteq Z$ or $ax_2 = Z \sqsubseteq Y$. Ontologies $\mathcal{O}_1$ and $\mathcal{O}_2$, as well as KBs $\mathcal{KB}_{ax_1}^{int} = \mathcal{O}_1 \cup \mathcal{O}_2 \cup \mathcal{M} \setminus \{ax_1\}$ and $\mathcal{KB}_{ax_2}^{int} = \mathcal{O}_1 \cup \mathcal{O}_2 \cup \mathcal{M} \setminus \{ax_2\}$ are depicted graphically in FIGS. 2(d) and 2(e) respectively, where solid lines denote subclass relations, and dashed lines the two mappings.

As can be seen, although both integrated ontologies do not exhibit violations over $\mathcal{O}_1$, the two cases differ in the amount of changes they impose on the classes of $\mathcal{O}_1$. In the first case $\mathcal{KB}_{ax_1}^{int} \models D \sqsubseteq X$ whereas in the latter case $\mathcal{KB}_{ax_2}^{int} \models \{B \sqsubseteq Z, C \sqsubseteq Z, D \sqsubseteq Z, D \sqsubseteq X\}$, i.e. there are more changes to the first ontology in the latter case. Hence, in this scenario Example 5 will compute Exclusions:=$\{ax_1\}$ Although, some of the embodiments described herein are strict with respect to violations that are implied by the mappings to the structure of the KB, some of the embodiments are more relaxed with respect to violations over the ontology that is being used for the enrichment.

In some embodiments, several heuristics can be used in order to decide which violations to allow and which to repair. A violation $A \sqsubseteq B \in diff_{Sig(\mathcal{O}_2)}^{\geq 6}(\mathcal{O}_2, \mathcal{O}_1 \cup \mathcal{O}_2 \cup \mathcal{M})$ may be allowed if A and B are somehow semantically related, e.g., if A and B have a common descendant. In contrast, a violation should be repaired if $\mathcal{O}_2 \models A \sqsubseteq \neg B$ i.e., A and B are disjoint or if the assumption of disjointness can be applied to them—that is, if A and B are in different (distant) parts of the hierarchy of $\mathcal{O}_2$ and hence it can be assumed that they are disjoint.

Algorithm 3 below relates to a method for repairing violations over the ontology that is used for the enrichment. The algorithm will also be described with reference to FIG. 6.

---

Algorithm 3 postProcessNewOntoStructure $(\mathcal{O}_1, \mathcal{O}_2, \mathcal{M}, Config)$ Input: Two ontologies $\mathcal{O}_1, \mathcal{O}_2$ and a set of mappings $\mathcal{M}$ computed between them.

1: $\mathcal{M}_{1-m} := \{\langle C, D\rangle | \{\langle C, D\rangle, \langle C, D\rangle\} \subseteq \mathcal{M} \wedge D_i \neq D_j\}$.
2: $\mathcal{M}' := \mathcal{M} \setminus \mathcal{M}_{1-m}$
3: for all $C \in Sig(\mathcal{O}_1)$ do
4:   $\mathcal{M}' := \mathcal{M}' \cup$ disambiguate-1-m($\{\langle C, D\rangle | \langle C, D\rangle \in \mathcal{M}_{1-m}\}$, Config)
5: end for
6: ConflictSets := $\{\{m_1, m_2\} | \mathcal{O}_1 \cup \mathcal{O}_2 \cup \{m_1, m_2\} \models A \sqsubseteq B, \mathcal{O}_2 \not\models A \sqsubseteq B\}$
7: for all $\{\langle D_1, D'_1\rangle, \langle D_2, D'_2\rangle\} \in$ ConflictSets do
8:   if no D such that $\mathcal{O}_2 \models_{rdfs} D \sqsubseteq D'_1 \sqcap D'_2$ exists then
9:     if $D'_1 \sqsubseteq \neg D'_2 \in \mathcal{O}_2$ and C exist s.t. $\mathcal{O}_1 \cup \mathcal{O}_2 \cup \mathcal{M}' \models_{rdfs} C \sqsubseteq D'_1 \sqcap D'_2$ then
10:       prune($\mathcal{M}' \cup \mathcal{O}_2, \{\{\langle D_1, D'_1\rangle, \langle D_2, D'_2\rangle\}, \{D'_1 \sqsubseteq \neg D'_2\}\}$)
11:     else if semSim($D'_1, D'_2$) $\leq$ Config.Distance.thr then
12:       prune($\mathcal{M}', \{\{\langle D_1, D'_1\rangle, \langle D_2, D'_2\rangle\}\}$)
13     end if
14:   end if
15: end for
16: return $(\mathcal{O}_2, \mathcal{M}')$ Like before mappings of higher multiplicity are identified in step S301 and are treated separately by function disambiguate-1-m in step S303. However, here the function is applied to sets of mappings of the form $\{\langle C, D_1\rangle, \langle C, D_2\rangle \ldots \langle C, D_n\rangle\}$.

Figure 5:
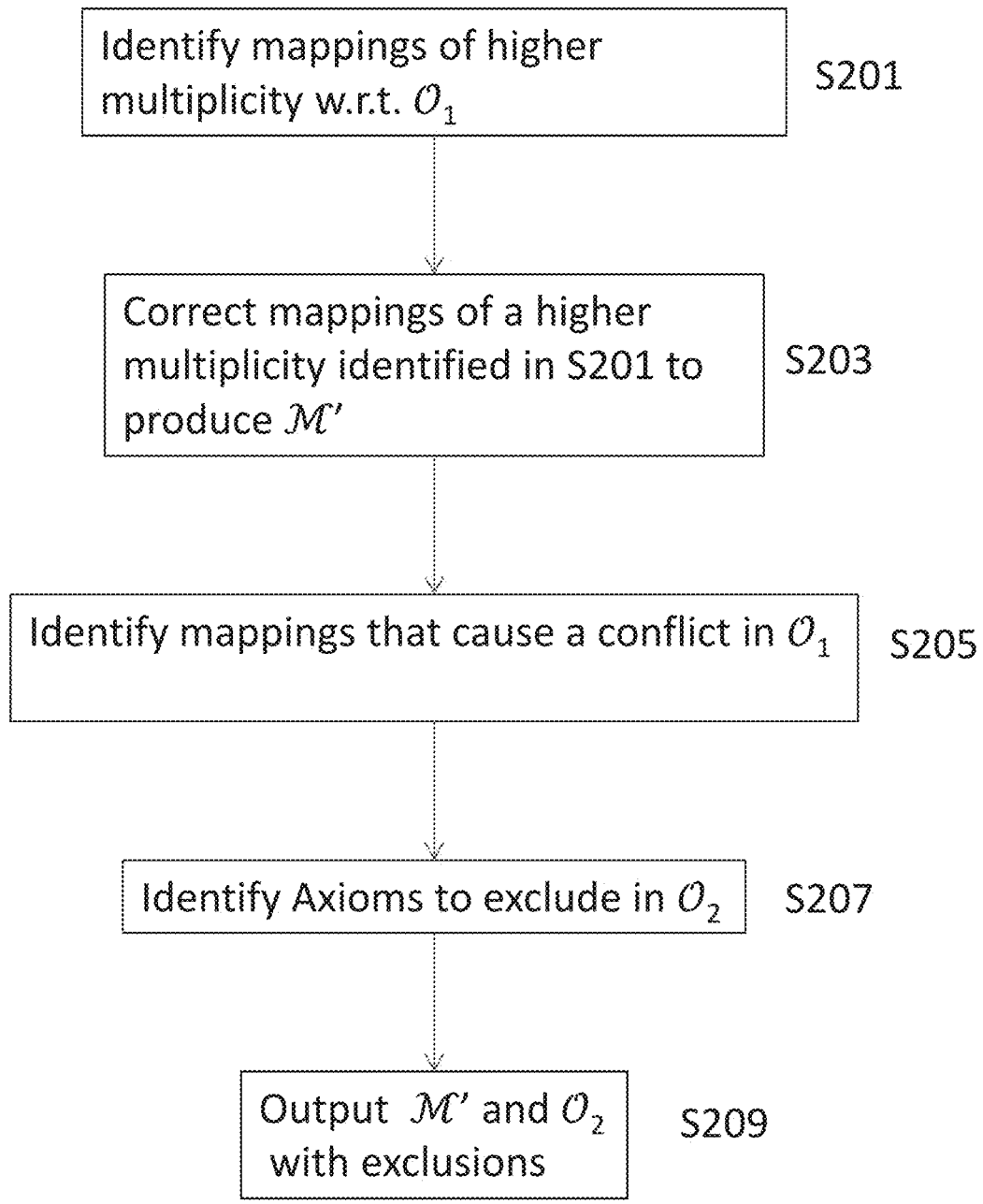
FIG. 5 is a flow chart of a method in accordance with an embodiment of the present invention showing methods of repairing violations due to the first ontology.
Figure 6:
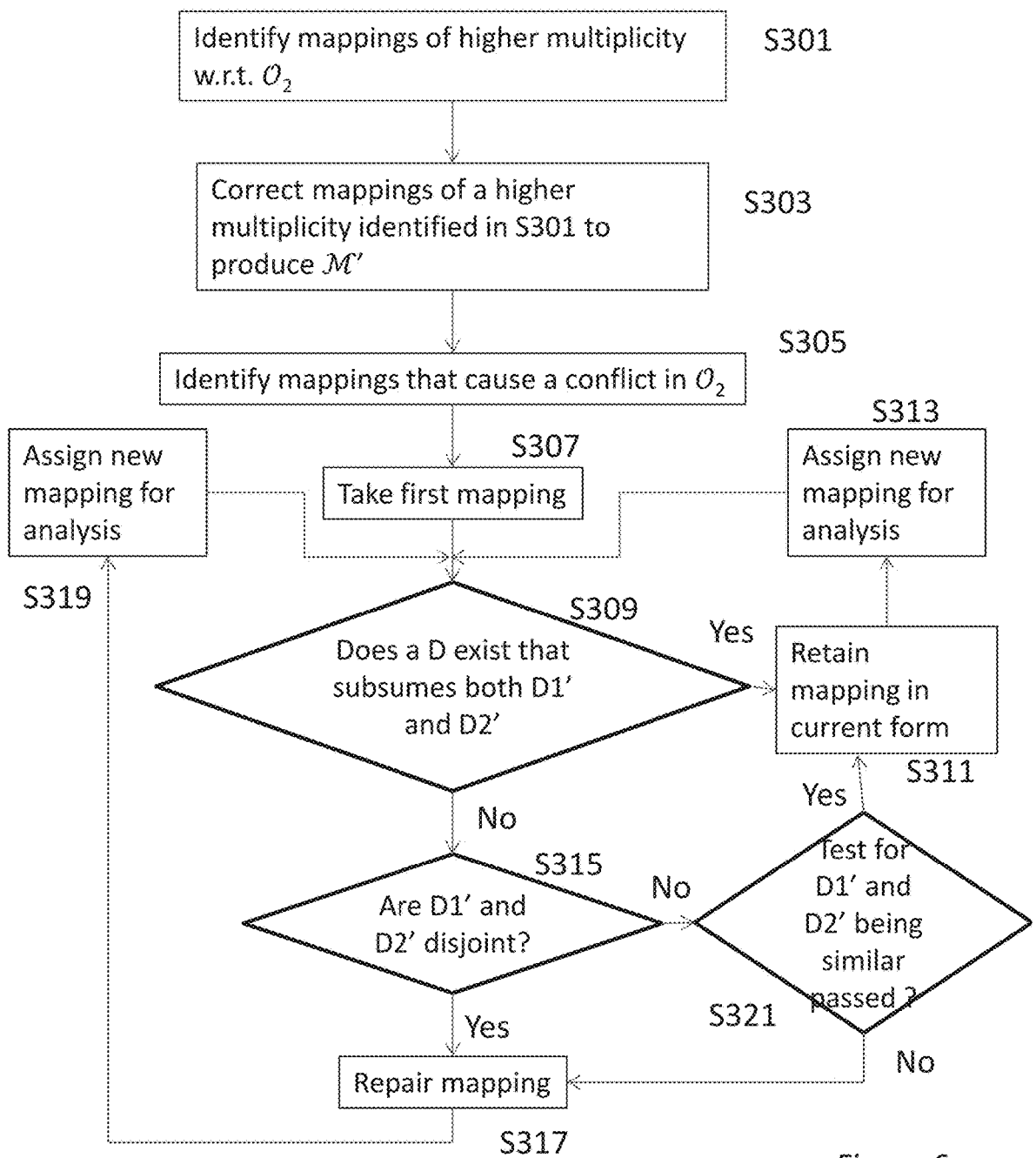
FIG. 6 is a flow chart of a method in accordance with an embodiment of the present invention showing methods of repairing violations due to the second ontology.

Disambiguate-1-m in step S303 operates in the same manner as described for Disambiguate-m-1 in step S203 of FIG. 5.

Afterwards, the algorithm iterates over all violations w.r.t. ontology $\mathcal{O}_2$. As before, in step S305, pairs of mappings that cause a conflict in $\mathcal{O}_2$ are identified as conflict sets:
ConflictSets:=$\{\{m_1,m_2\} | \mathcal{O}_1 \cup \mathcal{O}_2 \cup m_1, m_2\} \models A \sqsubseteq B, \mathcal{O}_2 \not\models A \sqsubseteq B\}$ Next, many of the aforementioned heuristics, like common descendants, unsatisfiability of classes and semantic or taxonomical similarity (function semSim) together with a pre-defined threshold Config:Distance:thr in order to decide to repair them or not.

In step S307, the first mapping is processed. It is assumed that the pair of mappings map $D_1$ to $D_1'$ and $D_2$ to $D_2'$. In step S309, it is checked to see if there exists in $\mathcal{O}_2$ a $D_1 \sqsubseteq D_1' \pi D_2'$. If this is true, then the mapping does not need to be repaired. Here, the mapping is retained in its current form in step S311 and then a new mapping that causes a violation is selected in step S313.

Next in step S315, it is checked to see if $D_1'$ and $D_2'$ are disjoint. If they are, then the mapping is repaired in step S317. The mapping can be repaired by either of the following: remove the disjointness axiom and not state that they are disjoint anymore; or drop some of the mappings and keep their disjointness axiom. The implementation is case specific but in many cases the disjointness axioms is removed and in Algorithm 3 this is determined in the implementation of the prune( ) function which takes as input the disjointness axiom and the mappings causing the violation and decides which of these to remove.

A new mapping is then assigned for analysis in step S319 and the method loops back to step S309.

If $D_1'$ and $D_2'$ are not disjoint, a test is performed in step S321 using the semSim function described before and this is compared with a threshold value in the config file to see if $D_1'$ and $D_2'$ are similar. If they are similar then the mapping is retained in its current form and a new mapping is assigned for analysis in step S313. If they are not similar, then the mapping is repaired in step S317; in algorithm 3 this is again accomplished by function prune( ). However, in this situation, the mapping is repaired as opposed to an axiom being dropped.

Embodiments will now be described relating to concrete implementations of the algorithms and functions presented above and used to create a medical KB from existing ontologies.

Regarding matching (lines 2-6 of Algorithm 1), two label-based matchers are implemented, namely ExactLabel-Matcher and FuzzyStringMatcher. The former builds an inverted index of class labels after some string normalisations, like removing possessive cases (e.g., Alzheimer's) and singularisation and matches ontologies using these indexes. The latter is based on the ISub string similarity metric. Since this algorithm does not scale well on large inputs it is mostly used for disambiguating higher-multiplicity mappings or re-scoring subsets of mappings with low confidence degrees.

In addition to these matchers, the state-of-the-art systems AML and LogMap can also be used in Algorithm 1. Regarding functions disambiguate-m-1 and disambiguate-1-m the strategy described above was used.

The algorithms used in the embodiments presented herein are also using approximations of plan computation and violation repair.

Both algorithms 2 and 3 above assume that violations stem from pairs of "conflicting mappings" like those mentioned above. The embodiments described herein again using the heuristics of common descendants, disjoint classes and class similarity as a guide for repairing the violations.

In the above embodiments, methods and systems of integrating ontologies for the purposes of constructing large KBs are described. An iterative approach is provided where one starts from a seed ontology as an initial KB and new ontologies are used to iteratively enrich and extend it.

A modular and highly configurable framework is provided which uses ontology matching to discover correspondences between the inputs and conservativity for tracking structural changes implied by them. Further, the structural changes are repaired in a fine-grained way other than just simply dropping mappings.

First, violations stemming from mappings of higher-multiplicity (i.e., those that map two entities from one ontology to the same entity in the other) are separated from the rest and both are treated differently using appropriate functions. Violations due to mappings of higher-multiplicity originate from the labels of the classes (which are used to compute the mappings in the first place) and not necessarily from structural differences of the ontologies hence these are repaired by altering the mappings.

Nevertheless, the rest of the violations are treated by dropping axioms from the new ontologies instead of dropping mappings. This approach is selected because the application has already committed to the structure of the KB and parts of the new ontology that are in disagreement with this conceptualisation can be dropped.

Further, this approach helps avoid the issue of ambiguity and duplication mentioned above. Regarding violations on the structure of the new ontology, again following a fine-grained approach mappings of higher multiplicity are treated first. Subsequently, mappings that cause incoherences can be repaired by either discarding some of the mappings or by even discarding axioms from the new ontology that cause these incoherences. Finally, the rest of the violations are treated by dropping mappings since one cannot drop axioms (like before) from the KB and alter its structure.

The overall framework has been formalised using the notion of a (maximal) safe extension of a KB, defined the properties that the used functions need to satisfy and provide an exact algorithm that is based on repair plan computation.

Detecting all violations and repair plans is a computationally very hard problem. Consequently, there is a need for a concrete implementation of the framework which is using approximate but efficient algorithms for violation detection (actually all state-of-the-art systems are based on approximate algorithm).

An experimental evaluation and a comparison against state-of-the-art mapping repair systems obtaining encouraging results will be provided. Embodiments provided herein allow an implementation that can employ a general conservativity-based mapping repair strategy (not only mapping coherency detection) on large biomedical ontologies and is the only approach that creates a KB with far less distinct classes with overlapping labels (i.e., less ambiguity and duplication). In addition, no conservativity violations could be detected in the produced integrated KB.

Using Algorithm 1 and the techniques presented above a large medical KB is constructed as an example. The SNOMED January 2018 release (which contains 340 K classes and 511 K SubClassOf axioms) is used as a starting seed KB ($\mathcal{KB}_1$) and the following ontologies have been iteratively integrated: NCI version 17.12d (which contains 130 K classes and 143 K subClassOf axioms), CHV latest version from 2011 (which contains 57 K classes and 0 SubClassOf axioms) and FMA version 4.6.0 (which contains 104 K classes and 255 K subClassOf axioms).

As a matching algorithm the ExactLabelMatcher described above has been used. Statistics about the KBs that were created after each integration are depicted in Table 1. CHV is a at list of layman terms of medical concepts. From that ontology only label information was integrated for the classes in CHV that mapped to some class in the KB; hence only data type properties increased in the KB in that step.

TABLE 1

Statistics about the KB after each integration/enrichment iteration.

|  | SNOMED | +NCI | +CHV | +FMA |
|---|---|---|---|---|
| Classes | 340 995 | 429 241 | 429 241 | 524 837 |
| Properties | 93 | 124 | 124 | 219 |
| SubClassOf Axioms | 511 656 | 617 542 | 617 542 | 713 313 |
| ObjPropAssertions | 526 146 | 664 742 | 664 742 | 962 190 |
| DataPropAssertions | 543 416 | 946 801 | 1 043 874 | 1 211 459 |

An experimental evaluation was conducted in order to assess the effectiveness of ten embodiments described herein for integrating ontologies and remedying conservativity violations. For the evaluation SNOMED, NCI, and FMA was used. Having SNOMED as the initial Knowledge Base NCI and then FMA (starting again from scratch) were intergrated to the initial knowledge base.

Next, the ExactLabelMatcher described above was used once with the last post-processing steps and once by deactivating them (lines 15 and 16). In the following the former setting is called bOWLing and the latter bOWLing$_n$ were called. The latter setting was used as a baseline naive approach.

In addition, Algorithm 1 above was run using AML and two versions of LogMap called LogMap$_O$ and LogMap$_c$. In the following, AML and LogMap$_O$ repair mappings with respect to coherency, i.e., they only check for conservativity violations that lead to unsatifiable classes. NCI contains 196 while FMA 33.5 K disjoint classes axioms so this mapping repair is relevant. In contrast, LogMap$_c$ also checks for more general conservativity violations.

For all these systems the post-processing steps of Algorithm 1 were disabled in order to assess each system's specific mapping repair functionality. On the mapping sets computed by bOWLing$_n$ and LogMap$_O$, Alcomo was also run as a post-processing step. Alcomo is not a general matcher but a mapping repair system that can be used as a post-processing step. In the following we denote these settings as bOWLing$_n^{Alc}$ and LogMap$_O^{Alc}$.

When using AML and LogMap$_c$, Algorithm 1 did not terminate after running for more than 16 hours. As a second attempt, the ontologies were fragmented into modules and these were fed these one by one into the above described algorithms. For NCI 53 models were identified, while for FMA 6 modules. Even in this case AML did not terminate when integrating FMA.

The results are summarised in Table 2 where the number of mappings computed by each system ($|\mathcal{M}|$) is given, the number of SubClassOf axioms in the integrated ontology ($|\mathcal{KB}^{int}|$) the number of axioms in $\mathrm{diff}^{\approx}_{sig(\mathcal{KB})}(\mathcal{KB},\mathcal{KB}^{int})$ (denoted by |LDiff|), and the time to compute $\mathcal{KB}^{int}$ (in minutes). Due to the very large size of the KB LDiff cannot be computed by any OWL reasoner so the RDFS-level differences were computed instead by simply traversing the SubClassOf hierarchy of the KB. In addition, the following are also computed:

number of cycles/loops of the form $\{A_1 \sqsubseteq A_2, \ldots A_n \sqsubseteq A_1\} \subseteq \mathcal{KB}^{int}$. From a semantic point of view such loops are not problematic, however, they can cause difficulty in traversing the hierarchy of the KB, extracting paths and counting the depth of the hierarchy.

a notion of "ambiguity" which will be defined as the number of times a label appears in two different classes of a given ontology. This metric is calculated over the original SNOMED, NCI, and FMA ontologies in order to measure their level of ambiguity. The results obtained were 1055, 4873, and 282, respectively, e.g., in SNOMED 1055 labels appear in more than one different classes.

| SNOMED + NCI | | | | | |
|---|---|---|---|---|---|
| | $|\mathcal{M}|$ | $|\mathcal{KB}^{int}|$ | |LDiff| | Time | Loops | ambiguity |
| bOWLing$_n$ | 30 675 | 677 939 | t.o. | 12.7 | 127 | 16 708 |
| bOWLing$_n^{Alc}$ | 26 825 | 666 834 | 0.9 m | 35.9 | 100 | 17 177 |
| bOWLing | 19 258 | 638 702 | 0 | 12.2 | 0 | 7 810 |
| LogMap$_O$ | 27 967 | 664 837 | 1.7 m | 120.9 | 74 | 17 632 |
| LogMap$_O^{Alc}$ | 27 763 | 664 354 | 1.5 m | 141.7 | 71 | 16 986 |
| LogMap$_c$ | 21 838 | 433 711 | 897 | 54.4 | 0 | 8,266 |
| AML | 32 623 | 635 876 | t.o. | 75.0 | 298 | 14 353 |

| SNOMED + FMA | | | | | |
|---|---|---|---|---|---|
| | $|\mathcal{M}|$ | $|\mathcal{KB}^{int}|$ | |LDiff| | Time | Loops | ambiguity |
| bOWLing$_n$ | 8 809 | 614 728 | 240k | 7.0 | 3 | 1 946 |
| bOWLing$_n^{Alc}$ | 7 866 | 615 291 | 93k | 76.2 | 1 | 2 000 |
| bOWLing | 8 176 | 608 060 | 0 | 27.9 | 0 | 1 440 |
| LogMap$_O$ | 7 334 | 615 252 | 117k | 360.4 | 1 | 2 264 |
| LogMap$_O^{Alc}$ | 6 986 | 615 689 | 57k | 428.4 | 1 | 2 253 |
| LogMap$_c$ | 6 036 | 420 424 | 517 | 14 004.8 | 0 | 1 553 |

One thing to note from the table is that all systems compute mapping sets of comparable size with the exception of bOWLing on SNOMED+NCI which computes a smaller mapping sets. This is mostly due to functions disambiguate-m-1 and disambiguate-1-m which prune mappings of higher-multiplicity. However, it should be noted that all mappings computed by this approach are one-to-one mappings, while in all other approaches from the roughly 27 k mappings about 17 k are actually one-to-one (i.e., fewer than those of bOWLing).

The application of Alcomo on the mapping sets does remove some mappings in an attempt to repair the sets while LogMap$_c$ that uses a general conservativity-based repairing approach also computes fewer mappings than LogMap$_c$.

As expected, the ontology produced by bOWLing contains fewer axioms due to the axiom exclusion strategy implemented in line 16 of Algorithm 1 which drops about 30% of NCI axioms and 10% of FMA axioms. However, the gains from this approach are apparent when considering other computed metrics. More precisely, the integrated ontology produced by bOWLing contains no axioms in LDiff in contrast to even more than 1 million new ancestor classes in some of the other approaches.

Moreover, there are no cycles and, finally, a much smaller degree of ambiguity, introducing almost no ambiguity at all if the initial ambiguity of these ontologies (see above) is also considered. The use of Alcomo as a post-processing step on bOWLing$_n$ and LogMap$_O$ does improve the numbers on these metrics, however, as it only focuses on coherency and not general conservativity it does not eliminate them completely. The only comparable approach is LogMap$_O$ which computes a KB without cycles. However, LDiff is still not empty and the approach of dropping mappings increases the ambiguity metric. At this point, it should be remembered that Recall that it was only possible to run LogMap$_O$ on the modules. Had it run on the whole ontology, it is expected that the reported numbers would be higher since as one can note the integrated ontology in this module approach is also much smaller (almost ⅓ smaller). Finally, compared to all other systems the approach in accordance with embodiments of the invention is much more scalable requiring a few minutes whereas in all other settings Algorithm 1 could take from one even up to 4 hours (even when restricted to the modules). Note that in some cases LDiff could not be computed (was running for more than 12 hours).

The above embodiments allow the problem of building large KBs from existing ontologies by integrating them and retaining as much of their initial structure and axioms as possible. Starting with an initial ontology as a seed KB the new ontologies are used to extend and enrich it in an iterative way. Overlaps are discovered using ontology matching algorithms and mappings are post-processed in order to preserve properties of the structures of the KB and the new ontology. The algorithm is highly modular as different strategies for handling higher multiplicity mappings can be implemented and different (or multiple) matchers can be used.

The post-processing steps are based on the notion of conservativity. However, above an approach is presented where axioms are removed from the new ontology in order to repair violations. This is important in order to keep ambiguity low and to reduce the classes with overlapping labels.

The framework present above is formalised and uses concrete approximate and practical algorithms. The experimental evaluation above demonstrates that the conservativity repairing approach to state-of-the-art mapping repair systems obtains very encouraging results. In summary, the results verify that ambiguity is very-low (almost none introduced compared to the initial ambiguity of the input ontologies), there were no detectable violations (LDiff), no cycles, and the algorithm scales.

Figure 7:
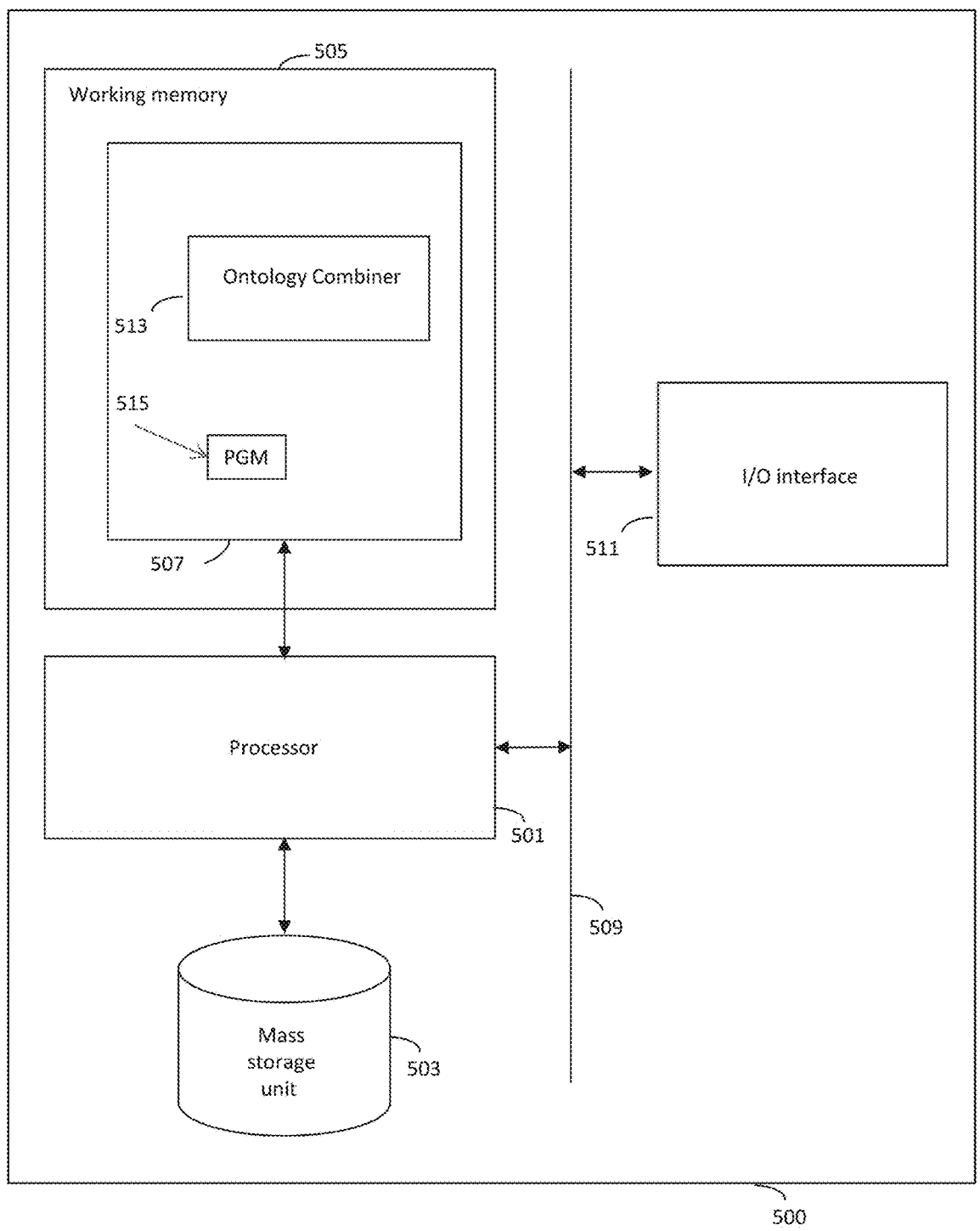
FIG. 7 is a schematic of an apparatus in accordance with an embodiment.

While it will appreciate that the above embodiments are applicable to any computing system, an example computing system is illustrated in FIG. 7, which provides means capable of putting an embodiment, as described herein, into effect. As illustrated, the computing system 500 comprises a processor 501 coupled to a mass storage unit 503 and accessing a working memory 505. As illustrated, an ontology combiner 513 is represented as software products stored in working memory 505. However, it will be appreciated that elements of the ontology combiner 513, for convenience, be stored in the mass storage unit 503. The ontology combiner 515, in this embodiment resides with a PGM that serves as a diagnostic engine that can provide a response to a user by accessing information from a combined ontology stored in the mass storage unit 503 and produced by the ontology combiner.

Usual procedures for the loading of software into memory and the storage of data in the mass storage unit 503 apply. The processor 501 also accesses, via bus 509, an input/output interface 511 that is configured to receive data from and output data to an external system (e.g. an external network or a user input or output device). The input/output interface 511 may be a single component or may be divided into a separate input interface and a separate output interface.

Thus, execution of the ontology combiner 513 by the processor 501 will cause embodiments as described herein to be implemented.

The ontology combiner 513 can be embedded in original equipment, or can be provided, as a whole or in part, after manufacture. For instance, the ontology combiner 513 can be introduced, as a whole, as a computer program product, which may be in the form of a download, or to be introduced via a computer program storage medium, such as an optical disk. Alternatively, modifications to existing ontology combiner software can be made by an update, or plug-in, to provide features of the above described embodiment.

The computing system 500 may be an end-user system that receives inputs from a user (e.g. via a keyboard) and retrieves a response to a query using a PGM 515 in contact with a knowledge base that has been developed by combining ontologies. Alternatively, the system may be a server that receives input over a network and determines a response. Either way, these combined ontologies may be used to determine appropriate responses to user queries, as discussed with regard to FIG. 1.

For instance, the mass storage unit may store a combined ontology using triple stores, and the system may be configured to retrieve a response with respect to an input query by querying the PGM 515. The system may then be able to determine an accurate and efficient output.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Much of the syntax introduced above is abstract and is based on syntax from Mathematical Logic. In order to encode knowledge in a computer system or software, axioms need to be encoded in some concrete syntax. One such way is by translating axioms and complex concepts into a graph-like representation using triples. A triple is a statement of the form <s p o> where s and o are two entities and p is some relation between s and o. For example, the axiom Male ⊑Person can be mapped to the following triple <Male subClassOf Person> where subClassOf is a pre-defined relation stating that Male is a sub-class of Person. The axiom Father⊑∃hasChild.Person can be translated to the triple <Father hasChild Person> although this translation is not the standard one according to the W3C standard. Yet another example, the axiom Female⊑¬Male can be captured by the triple
<Female disjointWith Male> where disjointWith is a pre-defined relation stating that Male and Female are disjoint.

Figure 8:
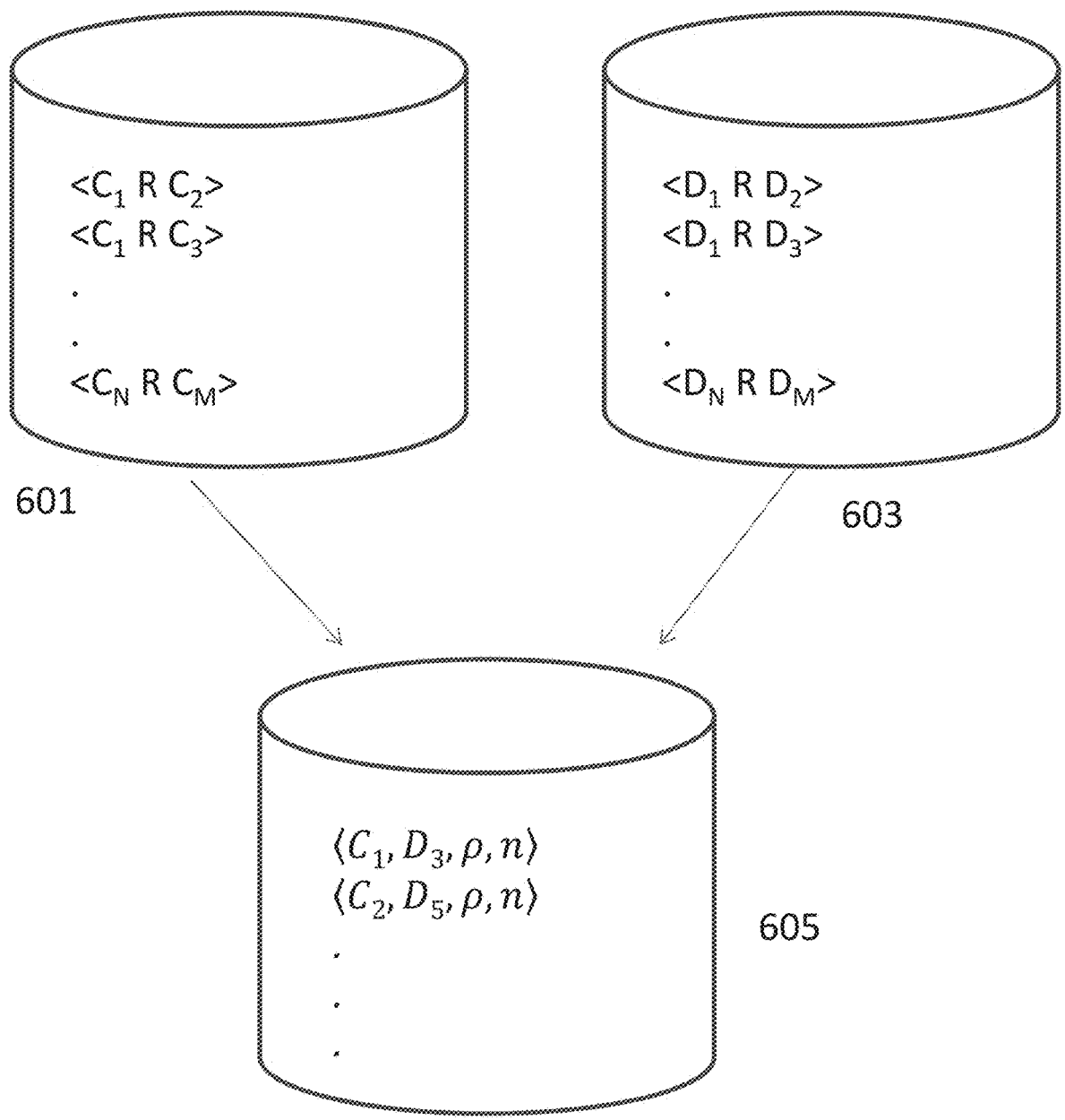
FIG. 8 is a schematic of a database arrangement with triple stores.

FIG. 8 is a schematic to aid visualisation of the processes that are performed when two ontologies are combined. In FIG. 8, three physically separate databases are shown, 601, 603 and 605. In the specific example of FIG. 8, the first database 601 comprises a first ontology, second database 603 comprises the second ontology and third database 605 stores the mappings between the first and second ontologies. However, it should be noted, that this arrangement is purely to demonstrate the combining of the two ontologies. In practice, the two ontologies prior to combining may be stored in the same physical database and the mapping between them may also be stored on the same database.

In the first database 601, the first ontology is stored in the form of triple stores, the entities may be concepts $C_1$ $C_2$ et cetera are linked by a relation R. The second database 603 comprises the second ontology stored in a similar manner, but here, concepts $D_1$, $D_2$ et cetera are stored in triple stores with concepts R.

For the ontologies is to be combined, mapping relations stored in third database 605 where the mapping between a concept in the first database 601 is stored with a concept from the second database 603, this is stored with the mapping relation ρ and a confidence value n on the mapping in the form of a 4-tuple.

As explained above, when the ontologies are combined, if there are violations, these violations are repaired. Some violations are repaired due to dropping the mapping (generally as a last resort) the dropping of the mappings can be stored in third database 605.

Where a violation is repaired by replacing an axiom or by introducing an exclusion, this repair can be stored as part of the second ontology in the second database 603.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

ANNEX

Table of Definitions

| Term | Description | Example |
|---|---|---|
| Simple Concept (also called Atomic Concept). In OWL jargon concepts are also called Classes | elementary entities intended to refer to some real-world notion and interpreted as a sets of things | Human, Male, TallPerson, Chairs |
| Role (aka Relation, or Property) | An entity that denotes relations between objects | hasChild, hasDiagnosis, isTreatedBy |
| | Operators | |
| ⊓ | Logical Conjunction also called AND for short. It can be used to form the conjunction of two concepts and create a new one. The conjunction of two concepts is interpreted as the intersection of the sets to which the two concepts are interpreted. | Professor ⊓ Male Intuition: represents the notion of a male professor. As a whole it is a concept. It is interpreted as the intersection of the sets to which concepts Professor and Male are interpreted |
| ∃ | Existential operator also called EXISTS for short. It can be used to combine a role with a concept to form a new concept | ∃ hasChild (the set of all things that have a child) ∃ hasChild.Male (the set of all things that have a child which is a male) |
| ⊨ | ⊨ Entails. Used to denote that something follows logically (using deductive reasoning) from something else | ∃ hasChild.Male ⊨ ∃ hasChild (if someone has a child which is a male, then it follows that they necessarily have some child). |
| ⊑ | Subclass or subProperty (aka inclusion) operator. Denotes an inclusion relation between two concepts or two relations. If one concept C is a subClass of another D then the set to which C is interpreted must be subset of the set to which D is interpreted. It can be used | Male ⊑ Person If something is a male then it is also a person (the set to which Male is interpreted is a subset of the set that Person is interpreted). |

-continued

| Term | Description | Example |
|---|---|---|
| | to form axioms. Intuitively it can be read as IF - THEN | |
| ⊆ | Subset relation between sets. | |
| ⊑ vs ⊆ | ⊑ denotes inclusion relation between classes. Classes are abstractions of sets. They don't have a specific meaning but meaning is assigned to them via interpretations. So when Male is written as a class it acts as a placeholder for some set of objects. Hence Male ⊑ Person means that every set to which Male is interpreted is a subset of every set that Person is interpreted. This relation is written as Male$^J$ ⊆ Person$^J$ where J is called an interpretation and it is a function that maps classes to sets. Hence, Male$^J$ is a specific set of objects | |
| ¬ | The Logical negation operator. It can be used in front of classes to create new classes that denote the negation (complement) former. | ¬Male denotes the set of objects that are not Male; so the interpretation of ¬Male (¬Male)$^J$ is the complement of the of the interpretation of Male, i.e. of Male |
| ⊑* | Subclass chaining. It is a shorthand for denoting that a chain (sequence) of subClass axioms exists in our knowledge base. For example, if Boy ⊑* Person is written then it implies that some chain of the form Boy ⊑ Male, Male ⊑ Person exists in the knowledge base | |
| | Terms used herein | |
| Axiom | A statement (property) about our world that must hold in all interpretations. Describes the intended meaning of the symbols (things) | Male ⊑ Person |
| Knowledge Base, Ontology | A set of axioms describing our world. | { Male ⊑ Person, Father ⊑ ∃ hasChild.Person } Intuition: Every male is also a person (the set to which Male is interpreted is a subset of the set to which Person is interpreted) Every father has a child that is a Person (the set to which we interpret Father is a subset to the set of things that have a child that is a Person) |
| Complex Concept | An expression built using atomic concepts and some of the aforementioned operators. The resulting expression is again a concept (an entity denoting some set of things.) | 1) Professor ⊓ Male, 2) Person ⊓∃ hasChild.Male Both complex concepts are conjunctions of two other concepts. The latter for example is a conjunction of Person and of ∃hasChild.Male. The whole complex concept is interpreted as the intersection |

| Term | Description | Example |
| --- | --- | --- |
| | | of the sets to which we interpret Person and that to which we interpret ∃ hasChild.Person. Intuitively this expression intends to denote the set of things that are Persons and have a child that is a Male |
| Example | | A knowledge base (or ontology) can entail things about our world depending on what axioms have been specified in it. Let O be the following ontology: O = { Female ⊑ Person, HappyFather ⊑ ∃ hasChild.Female, ∃ hasChild.Person ⊑ Parent}. Then, we have O ⊨ HappyFather ⊑ ∃ hasChild.Person Reason: Given our ontology that every female is a person and every happy father must have at least one child that is a female it follows using deductive reasoning that every happy father must have a child that is a person. We also have O ⊨ HappyFather ⊑ Parent |
| Unsatisfiable | | The complex concept ¬Male⊓Male is unsatisfiable since no object can belong at the same time to class Male and its complement. |
| Unsatisfiable wrt some KB | The axioms specified in a KB may imply that some class is unsatisfiable | Assume the KB = {Female ⊑ ¬Male} saying that every female is not a male. Then, the class Female⊓Male is unsatisfiable wrt KB |
| Coherent | If all classes mentioned in a KB are satisfiable wrt it then the KB is called coherent; otherwise it is called incoherent | |

The invention claimed is:

1. A computer implemented method of combining two knowledge bases, each knowledge base comprising concepts that are linked by relations, the method comprising:
   assigning one of the two knowledge bases as a first knowledge base and the other as an additional knowledge base;
   matching concepts between the first knowledge base and the additional knowledge base to define mapping relations between concepts of the first and additional knowledge bases;
   assessing the defined mapping relations to determine if any mappings cause a violation with relations already present in the first or additional knowledge base;
   modifying relations within the additional knowledge base to repair violations; and
   storing an extended first knowledge base comprising the first knowledge base, the defined mapping relations and the additional knowledge base with the modified relations within the additional knowledge base,
   wherein mappings that cause the violation are determined to be mappings that cause the violation with relations already present in the first knowledge base,
   wherein the modifying relations within the additional knowledge base comprises at least two options for repairing the violation and each option comprises removing an axiom from the additional knowledge base, the violation being repaired by removing the axiom in one of the two options that causes the lowest amount of changes to the first knowledge base.

2. The method according to claim 1, wherein the assessing defined mapping relations comprises assuming that the violation stems from exactly two mappings which map concepts between the first and additional knowledge bases.

3. The method according to claim 2, wherein the modifying relations within the additional knowledge base comprises assuming that each violation to be repaired stems from exactly two mappings which map concepts between the first and additional knowledge bases.

4. The method according to claim 1, wherein mappings that cause the violation are determined to be mappings that cause the violation with relations already present in the additional knowledge base.

5. The method according to claim 4, wherein prior to repairing the violation, determining whether the violation needs to be repaired.

6. The method according to claim 5, further comprising determining not to repair the violation if two concepts in the additional knowledge base to which mappings cause the violation are descended from a common concept.

7. The method according to claim 5, further comprising determining not to repair the violation if two concepts in the additional knowledge base to which mappings cause a violation are similar.

8. The method according to claim 4, further comprising determining if two concepts in the additional knowledge base to which mappings cause the violation are disjoint.

9. The method according to claim 8, wherein the violation caused by two disjoint concepts in the additional knowledge base is repaired by either removing the disjoint axiom or removing a mapping.

10. The method according to claim 4, wherein the violation is repaired by removing a mapping.

11. The method according to claim 1, further comprising separating mappings that cause a conflict into two groups prior to the modifying relations, wherein:
   a first group comprises mappings where two or more concepts from one knowledge base are mapped to a single concept in the other knowledge base; and
   a second group from mappings comprising the remaining mappings not in the first group.

12. Th method according to claim 11, wherein the mapping relations between the first and additional knowledge bases are modified to resolve conflicts for the first group.

13. The method according to claim 1, wherein the two knowledge bases are medical knowledge bases.

14. The method according to claim 1, wherein the two knowledge bases are stored in memory in a form of triple stores.

15. The method of proving a response to a query, the method comprising:
   using a probabilistic graphical model to query a knowledge base, wherein the knowledge base is constructed from at least two knowledge bases combined as recited in claim 1.

16. The non-transitory computer-readable storage medium including instructions stored thereon that, when executed by a computer, cause the computer to perform the method of claim 1.

17. A computer system adapted to combine two knowledge bases, each knowledge base comprising concepts that are linked by relations, the computer system comprising:
   a storage comprising the two knowledge bases; and
   a processor, the processor being configured to:
      assign one of the two knowledge bases as a first knowledge base and the other as an additional knowledge base;
      match concepts between the first knowledge base and the additional knowledge base to define mapping relations between concepts of the first and additional knowledge base;
      assess the defined mapping relations to determine if any mappings cause a violation with relations already present in the first or additional knowledge base;
      modify relations within the additional knowledge base to repair violations; and
      store in the storage an extended first knowledge base comprising the first knowledge base, the defined mapping relations and the additional knowledge base with the modified relations within the additional knowledge base,
   wherein mappings that cause the violation are determined to be mappings that cause the violation with relations already present in the first knowledge base,
   wherein the modifying relations within the additional knowledge base comprises at least two options for repairing the violation and each option comprises removing an axiom from the additional knowledge base, the violation being repaired by removing the axiom in one of the two options that causes the lowest amount of changes to the first knowledge base.

* * * * *